Patented Dec. 26, 1944

2,366,049

UNITED STATES PATENT OFFICE 2,366,049

RESIN COMPOSITION AND METHOD OF MAKING THE SAME

Claren R. Payne and Raymond B. Seymour, Allentown, Pa., assignors to The Atlas Mineral Products Company, Mertztown, Pa., a corporation of Pennsylvania No Drawing. Application February 27, 1941,
Serial No. 380,925

9 Claims. (Cl. 260—41)

This invention is a resinous composition produced from a mixture of a polymerizable furan derivative and a resin soluble therein.

It has been discovered that the polymerizable furfuryl alcohol is a good solvent for such resins as polyvinyl acetal, polyvinyl butyral, etc., the polyalkyl acrylates and poly-methacrylates, "A-stage" phenol-aldehyde resin, cashew nut oil, rosins, asphalts, and the like. The resins listed are illustrative of materials soluble in furfuryl alcohol. Therefore, whenever "a resin soluble in furfuryl alcohol" is hereinafter referred to in the specification or claims, it is intended to include in such term any of the materials above identified, or any other resin soluble in furfuryl alcohol.

These compositions when dissolved in furfuryl alcohol, for example, are fairly stable liquids of varying degrees of viscosity, depending upon the particular resin and the percentage thereof which is dissolved in the furfuryl alcohol. These more or less viscous liquid compositions are easily polymerized, at room temperatures, to very high-softening-point-resinous-solids by the addition of organic acid catalysts. For instance, formic acid, lactic acid, para toluene sulphonic acid, para toluene sulpho chloride, aryl alkyl sulphates and chlorides, chlor acetic acid, malic acid, maleic acid, tartaric acid and phthalic acid, which may be taken as illustrative of organic acid catalysts, all of which have an ionization constant equal to or greater than lactic acid which has an ionization constant of $1.38 \times 10^{-4}$ at 25 degrees centigrade, have all been found satisfactory. Therefore, wherever the term "acid catalyst" is used without qualification, it is intended to include any organic acid or organic acid compound which has an ionization constant equal to or greater than $1.38 \times 10^{-4}$ at 25 degrees centigrade. It is preferred to use para toluene sulphonic acid or para toluene sulpho chloride.

These polymerized high-softening-point-products are somewhat similar to the phenol-formaldehyde resins, with the two important advantages that polymerized compositions are obtainable of almost any degree of flexibility, and which are inert to alkalies of all concentrations. The greater the content of furfuryl alcohol in these compositions, the less the flexibility of the polymerized product.

Such polymerized compositions, either alone or mixed with inert fillers, such as silica, carbon, asbestos or the like, have many industrial applications. For instance, an acid and alkali-proof cement may be produced as follows:

Example I 100 parts by weight of a resin composition consisting of a mixture of 95% furfuryl alcohol and 5% of polyvinyl butyral, or other resin soluble in furfuryl alcohol, mixed with 195 parts by weight of carbon and 5 parts by weight of para toluene sulphonic acid, or 10 parts by weight of para toluene sulpho chloride.

Example II 100 parts by weight of a resinous composition consisting of 50% furfuryl alcohol, 16% furfuryl aldehyde and 30% poly butyl methacrylate (or other soluble resin), mixed with 195 parts by weight of carbon, and 10 parts by weight of para toluene sulpho chloride.

The above examples are given for purposes of illustration, and it is to be understood that the relative proportions given may be varied without departing from the spirit of the invention.

Such a cement is excellent for the joining of bricks in the construction of corrosion-proof tank linings, floors and the like. Quite obviously, the percentage composition of the materials listed above may be varied over a wide range to produce cements of desired physical and chemical properties. The cement above described remains workable for approximately thirty minutes at room temperature, then hardens and polymerization is complete in approximately twenty-four hours. In practice, it is desirable that the mixture remain workable for at least thirty minutes, and it is easier to obtain this workability when organic acids are used as catalysts instead of inorganic acids. Incidentally, acid-producing substances may also be used instead of the acids being used directly.

In the fabrication of these cements, it is important to have a liquid resin composition of a viscosity which gives a good workable cement. For this purpose, viscosities ranging from 4 to 100 seconds (Gardner & Holdt) have been found to be quite satisfactory. Such resin compositions may be used to cast corrosion-proof tanks or other equipment from them in such manner as one constructs equipment of reinforced concrete. The reinforcement could be embedded in the resin cement in the usual manner, or the tank could be supported by steel or alloy angles around the outside. For this work it may be desirable to replace the carbon with fiber or leave fillers out of the composition entirely. They may also be used advantageously for the protection of porous surfaces, such as wood or leather. In either instance, the material is coated with a mixture of furfuryl alcohol and resin, and a catalyst, and then polymerized in situ.

If a more flexible cement is required, the percentage of polyvinyl butyral, or other soluble resin is increased and the percentage of filler is decreased, or the filler may be entirely eliminated. The more flexible compositions may prove more satisfactory when the material is applied to steel, concrete or the like as a thin coating. These materials may also be applied as coatings to steel, cast iron, concrete or the transite pipe. As a primer on metallic and other surfaces, it has been found that derivatives or isomers of rubber, as well as Bakelite paints, work very well. Such coatings are also of value for the lining of tanks used for holding hot water in homes. In some applications it is desirable to mix these compositions with toluene or other evaporable solvents with which they are miscible. By evaporable solvents is meant those solvents which will evaporate at room temperature and which are miscible with furfuryl alcohol, such as alcohol, carbon tetrachloride, and ethylene dichloride.

Instead of the polymerized resins, such as polyvinyl butyral, the methacrylates or acrylates having an alkyl group of butyl or larger, may be used, and the composition polymerized by the addition of acid and a catalyst for the conversion of these monomers to the polymers. Butyl methacrylates and butyl acrylates may be considered as examples of the methacrylate and acrylate monomers, and benzoyl peroxide is an example of the proper type of catalyst.

The resinous compositions made in accordance with the present invention is susceptible of many uses, some of which have been enumerated, and it is believed that the inherent advantages thereof, as indicated by the diversity of its uses, will be readily apparent to those skilled in the art to which it appertains.

What we claim is:

1. The method of producing an alkali-acid-proof cement of 4 to 100 seconds' viscosity which comprises dissolving polyvinyl butyral in furfuryl alcohol, the quantities thereof being proportioned to produce a resin of said viscosity, and then polymerizing the furfuryl alcohol by adding an organic acid catalyst of sufficiently reduced concentration to maintain the cement in a workable condition for approximately 30 minutes at room temperature, said catalyst having an ionization constant of not less than $1.38 \times 10^{-4}$ at 25° C.

2. The method of producing an alkali-acid-proof cement which comprises dissolving polyvinyl butyral in an amount of furfuryl alcohol proportioned to produce a solution having a viscosity of 4 to 100 seconds, and then polymerizing the furfuryl alcohol by adding an acid catalyst of sufficiently reduced concentration to maintain the cement in a workable condition for approximately 30 minutes at room temperature, said catalyst having an ionization constant of not less than $1.38 \times 10^{-4}$ at 25° C.

3. The method of producing an alkali-acid-proof cement which comprises dissolving polyvinyl butyral in an amount of furfuryl alcohol proportioned to produce a solution having a viscosity of 4 to 100 seconds, and then polymerizing the furfuryl alcohol by adding an acid catalyst of sufficiently reduced concentration to maintain the cement in a workable condition for approximately 30 minutes at room temperature and harden within 24 hours, said catalyst having an ionization constant of not less than $1.38 \times 10^{-4}$ at 25° C.

4. The method of producing an alkali-acid-proof cement which comprises dissolving polyvinyl butyral in an amount of furfuryl alcohol proportioned to produce a solution having a viscosity of 4 to 100 seconds, and then polymerizing the furfuryl alcohol by adding an organic acid catalyst of sufficiently reduced concentration to maintain the cement in a workable condition for approximately 30 minutes at room temperature and harden within 24 hours, said catalyst having an ionization constant of not less than $1.38 \times 10^{-4}$ at 25° C.

5. The method of producing an alkali-acid-proof cement which consists in dissolving polyvinyl butyral in furfuryl alcohol, the quantities thereof being proportioned to produce a resin solution of 4 to 100 seconds, and then polymerizing the furfuryl alcohol by mixing the resin solution with an inert filler and an acid catalyst of sufficiently reduced concentration to maintain the cement in a workable condition for approximately 30 minutes at room temperature, said catalyst having an ionization constant of not less than $1.38 \times 10^{-4}$ at 25° C.

6. The method of producing an alkali-acid-proof cement which consists in dissolving polyvinyl butyral in furfuryl alcohol, the quantities thereof being proportioned to produce a resin solution of 4 to 100 seconds, and then polymerizing the furfuryl alcohol by mixing the resin solution with an inert filler and an acid catalyst of sufficiently reduced concentration to maintain the cement in a workable condition for approximately 30 minutes at room temperature and harden within 24 hours, said catalyst having an ionization constant of not less than $1.38 \times 10^{-4}$ at 25° C.

7. The method of producing an alkali-acid-proof cement which consists of producing a resin solution by dissolving 5 parts by weight of polyvinyl butyral in 95 parts furfuryl alcohol and polymerizing the furfuryl alcohol by mixing the resin solution with approximately 195 parts by weight of carbon and an organic acid catalyst of sufficiently reduced concentration to maintain the mixture in a workable condition for 30 minutes at room temperature, said catalyst having an ionization constant of not less than $1.38 \times 10^{-4}$ at 25° C.

8. The method of producing an alkali-acid-proof cement which consists of producing a resin solution by dissolving 5 parts by weight of polyvinyl butyral in 95 parts furfuryl alcohol and polymerizing the furfuryl alcohol by mixing the resin solution with approximately 195 parts by weight of carbon and approximately 10 parts of an acid catalyst having an ionization constant of not less than $1.38 \times 10^{-4}$ at 25° C., the proportion of said catalyst being such as to cause the mixture to remain plastic for 30 minutes at room temperature.

9. The method of producing an alkali-acid-proof cement which consists of producing a resin solution by dissolving 5 parts by weight of polyvinyl butyral in 95 parts furfuryl alcohol and polymerizing the furfuryl alcohol by mixing the resin solution with approximately 195 parts by weight of carbon and approximately 10 parts of an acid catalyst having an ionization constant of not less than $1.38 \times 10^{-4}$ at 25° C., the proportion of said catalyst being such as to cause the mixture to remain plastic for 30 minutes at room temperature and to harden within 24 hours.

CLARON R. PAYNE.
RAYMOND B. SEYMOUR.